US012362388B2

(12) United States Patent
Jiang et al.

(10) Patent No.: US 12,362,388 B2
(45) Date of Patent: Jul. 15, 2025

(54) ELECTROCHEMICAL APPARATUS, PREPARATION METHOD THEREFOR, AND ELECTRONIC APPARATUS

(71) Applicant: Ningde Amperex Technology Limited, Ningde (CN)

(72) Inventors: Chenxi Jiang, Ningde (CN); Yafei Zhang, Ningde (CN); Hongming Yu, Ningde (CN); Xinghua Tao, Ningde (CN)

(73) Assignee: NINGDE AMPEREX TECHNOLOGY LIMITED, Ningde (CN)

(*) Notice: Subject to any disclaimer, the term of this patent is extended or adjusted under 35 U.S.C. 154(b) by 614 days.

(21) Appl. No.: 17/560,628

(22) Filed: Dec. 23, 2021

(65) Prior Publication Data
US 2022/0200050 A1    Jun. 23, 2022

(30) Foreign Application Priority Data
Dec. 23, 2020  (CN) .......................... 202011556239.9

(51) Int. Cl.
*H01M 10/0567*  (2010.01)
*H01M 4/02*  (2006.01)
(Continued)

(52) U.S. Cl.
CPC ... *H01M 10/0567* (2013.01); *H01M 10/0525* (2013.01); *H01M 2004/021* (2013.01);
(Continued)

(58) Field of Classification Search
CPC ......... H01M 10/0567; H01M 10/0525; H01M 4/386; H01M 4/505; H01M 4/525; H01M 2004/021; H01M 2300/0025
(Continued)

(56) References Cited

U.S. PATENT DOCUMENTS

2003/0190523 A1    10/2003  Omaru et al.
2010/0233549 A1    9/2010   Kim et al.
(Continued)

FOREIGN PATENT DOCUMENTS

CN    102637903 A    8/2012
CN    104577200 A    4/2015
(Continued)

OTHER PUBLICATIONS

Yang Xuerui et al. "Enabling Stable High-Voltage LiCoO(2) Operation by Using Synergetic Interfacial Modification Strategy" Advanced Functional Materials, vol. 20, #43, Sep. 3, 2020, p. 2004664(1-12).
(Continued)

*Primary Examiner* — Allison Bourke
*Assistant Examiner* — Robert Gene West
(74) *Attorney, Agent, or Firm* — XSENSUS LLP

(57) ABSTRACT

An electrochemical apparatus includes a positive electrode sheet including a positive electrode active material layer; a negative electrode sheet including a negative electrode active material layer; and a separator disposed between the positive electrode sheet and the negative electrode sheet. A mass ratio of fluorine to nitrogen on a surface layer of the positive electrode active material layer is A, a mass ratio of fluorine to nitrogen on a surface layer of the negative electrode active material layer is B, $3 \leq A \leq 50$, and $30 \leq B \leq 300$.

18 Claims, 1 Drawing Sheet

(51) Int. Cl.
  *H01M 4/131* (2010.01)
  *H01M 4/134* (2010.01)
  *H01M 4/38* (2006.01)
  *H01M 4/505* (2010.01)
  *H01M 4/525* (2010.01)
  *H01M 10/0525* (2010.01)

(52) U.S. Cl.
  CPC ............ *H01M 4/386* (2013.01); *H01M 4/505* (2013.01); *H01M 4/525* (2013.01); *H01M 2300/0025* (2013.01)

(58) Field of Classification Search
  USPC ........................................................ 429/199
  See application file for complete search history.

(56) References Cited

U.S. PATENT DOCUMENTS

| | | | | |
|---|---|---|---|---|
| 2013/0069601 A1* | 3/2013 | Coowar | ............ | H01M 10/0568 320/162 |
| 2019/0207256 A1 | 7/2019 | Peebles et al. | | |
| 2020/0099100 A1* | 3/2020 | Bo | ................... | H01M 10/0567 |
| 2020/0099101 A1 | 3/2020 | Li et al. | | |

FOREIGN PATENT DOCUMENTS

| | | |
|---|---|---|
| CN | 105655644 A | 6/2016 |
| CN | 108258315 A | 7/2018 |
| CN | 108550780 A | 9/2018 |
| CN | 109920978 A | 6/2019 |
| CN | 109921093 A | 6/2019 |
| CN | 110875499 A | 3/2020 |
| CN | 110931875 A | 3/2020 |
| JP | 2013110017 A | 6/2013 |

OTHER PUBLICATIONS

Farhat D, Maibach J, Eriksson H et al. "Towards high-voltage Li-ion batteries: Reversible cycling of graphite anodes and Li-ion batteries in adiponitrile-based electrolytes" Electrochimica Acta, vol. 281, Aug. 10, 2018, pp. 299-311.
PAT202008012CN1-OA1 mailed Nov. 2, 2021.

* cited by examiner

ELECTROCHEMICAL APPARATUS, PREPARATION METHOD THEREFOR, AND ELECTRONIC APPARATUS

CROSS-REFERENCE TO RELATED APPLICATIONS

This application claims priority to Chinese Patent Application No. 202011556239.9 filed on Dec. 23, 2020, the whole disclosure of which is incorporated herein by reference.

TECHNICAL FIELD

This application relates to the field of electronic technologies, and in particular, to an electrochemical apparatus, a preparation method therefor, and an electronic apparatus.

BACKGROUND

In recent years, the rapid development of electronic products and electric vehicles have imposed higher requirements on cycling performance of electrochemical apparatuses (for example, lithium-ion batteries). Although there are various methods at present to improve cycling performance of electrochemical apparatuses, these methods have not been completely satisfactory in every aspect. A further improvement on this aspect is expected.

SUMMARY

Embodiments of this application provide an electrochemical apparatus, including: a positive electrode sheet, where the positive electrode sheet includes a positive electrode active material layer; a negative electrode sheet, where the negative electrode sheet includes a negative electrode active material layer; and a separator, where the separator is disposed between the positive electrode sheet and the negative electrode sheet. In some embodiments, a mass ratio of fluorine to nitrogen on a surface layer of the positive electrode active material layer is A, a mass ratio of fluorine to nitrogen on a surface layer of the negative electrode active material layer is B, $3 \leq A \leq 50$, and $30 \leq B \leq 300$.

In some embodiments, $2 \leq B/A \leq 10$. In some embodiments, $20 \leq A \leq 50$, and $70 \leq B \leq 300$. In some embodiments, $3.30 \leq B/A \leq 3.90$. In some embodiments, $5.90 \leq B/A \leq 8.10$.

In some embodiments, a thicknesses of the surface layer of the positive electrode active material layer is 10 nm, and a thickness of the surface layer of the negative electrode active material layer is 10 nm. In some embodiments, the surface layer of the positive electrode active material layer includes no positive electrode active material, and the surface layer of the negative electrode active material layer includes no negative electrode active material.

In some embodiments, the electrochemical apparatus further includes an electrolyte, and the electrolyte includes at least one of a fluorine-containing compound or a nitrile compound.

In some embodiments, the fluorine-containing compound includes at least one of fluoroethylene carbonate, trifluoropropylene carbonate, trifluoroethyl methyl carbonate, fluorocarboxylate, or fluoroether.

In some embodiments, the nitrile compound includes at least one of a mononitrile compound, a dinitrile compound, or a trinitrile compound. In some embodiments, the mononitrile compound includes at least one of acetonitrile or p-methylbenzonitrile. In some embodiments, the dinitrile compound includes at least one of malononitrile, succinonitrile, hexanedinitrile, pentanedinitrile, octanedinitrile, or sebaconitrile. In some embodiments, the trinitrile compound includes at least one of hexanetrinitrile or 1,3,5-pentanetricarbonitrile.

In some embodiments, the negative electrode sheet includes a negative electrode active material, the negative electrode active material includes a silicon material, and the silicon material includes at least one of silicon, a silicon-oxygen compound, a silicon-carbon compound, or a silicon alloy.

In some embodiments, the positive electrode sheet includes a positive electrode active material, and the positive electrode active material includes at least one of a lithium cobalt oxide, a lithium nickel cobalt manganese oxide, or a lithium nickel cobalt aluminum oxide; and when a state of charge of the electrochemical apparatus is 100%, an open-circuit voltage of the electrochemical apparatus is greater than or equal to 4.15 V.

In some embodiments, the positive electrode active material includes the lithium cobalt oxide; and when the state of charge of the electrochemical apparatus is 100%, the open-circuit voltage of the electrochemical apparatus is greater than or equal to 4.35 V.

Another embodiment of this application provides an electronic apparatus, including the foregoing electrochemical apparatus.

Still another embodiment of this application provides a preparation method for an electrochemical apparatus. The preparation method includes: pre-lithiating a negative electrode sheet of the electrochemical apparatus; adding a first electrolyte to the electrochemical apparatus for first formation, where the first electrolyte includes a fluorine-containing compound; and adding a second electrolyte to the electrochemical apparatus for second formation, where the second electrolyte includes a fluorine-containing compound and a nitrile compound.

In some embodiments, the fluorine-containing compound includes at least one of fluoroethylene carbonate, trifluoropropylene carbonate, trifluoroethyl methyl carbonate, fluorocarboxylate, or fluoroether.

In some embodiments, the nitrile compound includes at least one of a mononitrile compound, a dinitrile compound, or a trinitrile compound.

In some embodiments, the mononitrile compound includes at least one of acetonitrile or p-methylbenzonitrile. In some embodiments, the dinitrile compound includes at least one of malononitrile, succinonitrile, hexanedinitrile, pentanedinitrile, octanedinitrile, or sebaconitrile. In some embodiments, the trinitrile compound includes at least one of hexanetrinitrile or 1,3,5-pentanetricarbonitrile.

In some embodiments, based on a mass of the first electrolyte, a mass percentage of the fluorine-containing compound is 5% to 40%. In some embodiments, based on a mass of the second electrolyte, a mass percentage of the fluorine-containing compound is 5% to 40%. In some embodiments, based on the mass of the second electrolyte, a mass percentage of the nitrile compound is 1% to 6%.

In this application, by controlling the mass ratio of fluorine to nitrogen on the surface layer of the positive electrode active material layer and the mass ratio of fluorine to nitrogen on the surface layer of the negative electrode active material layer, a stable anode solid electrolyte interphase (SEI) film is formed on a negative electrode surface, and a stable cathode electrolyte interphase (CEI) film is formed on a positive electrode surface, thereby improving cycling performance of the electrochemical apparatus.

DETAILED DESCRIPTION

The following embodiments may enable those skilled in the art to understand this application more comprehensively, but do not limit this application in any way.

Figure 1:
FIG. 1 is an expanded sectional view of an electrochemical apparatus according to an embodiment of this application.

Some embodiments of this application provide an electrochemical apparatus. FIG. 1 is an expanded sectional view of an electrochemical apparatus according to an embodiment of this application. The electrochemical apparatus includes a positive electrode sheet 10, a negative electrode sheet 12, and a separator 11 disposed between the positive electrode sheet 10 and the negative electrode sheet 12. In some embodiments, the positive electrode sheet 10, the negative electrode sheet 12, and the separator 11 are wound or laminated to form an electrode assembly, and the electrode assembly is accommodated in a housing.

Figure 2:
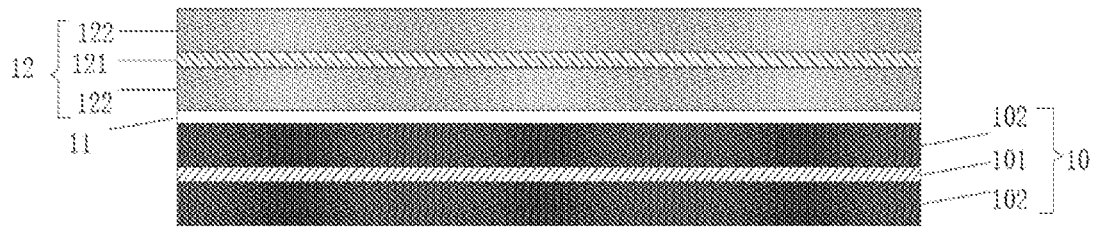
FIG. 2 is a more detailed view of the electrochemical apparatus of FIG. 1 according to an embodiment of this application.

As shown in FIG. 2, in some embodiments, the positive electrode sheet 10 may include a positive electrode current collector 101 and a positive electrode active material layer 102 coated on the positive electrode current collector 101. It should be understood that although FIG. 2 shows that the positive electrode active material layer 102 is provided on two sides of the positive electrode current collector 101, in some embodiments, the positive electrode active material layer 102 may be provided only on one side of the positive electrode current collector 101. In addition, in some embodiments, the positive electrode sheet 10 may include only the positive electrode active material layer 102 without the positive electrode current collector 101. In some embodiments, the negative electrode sheet 12 may include a negative electrode current collector 121 and a negative electrode active material layer 122 coated on the negative electrode current collector 121. It should be understood that although FIG. 2 shows that the negative electrode active material layer 122 is provided on two sides of the negative electrode current collector 121, in some embodiments, the negative electrode active material layer 122 may be provided only on one side of the negative electrode current collector 121. In addition, in some embodiments, the negative electrode sheet 12 may include only the negative electrode active material layer 122 without the negative electrode current collector 121.

Generally, stability of an anode solid electrolyte interphase (SEI, Solid Electrolyte Interphase) film and stability of a cathode electrolyte interphase (CEI, Cathode Electrolyte Interphase) film greatly affect cycling performance of the electrochemical apparatus. Some negative electrode film-forming additives, such as fluoroethylene carbonate (FEC), are added to an electrolyte to form a stable SEI film. In addition, some positive electrode film-forming additives, such as a nitrile compound, are added to the electrolyte to form a stable CEI film. However, the nitrile compound is easily reduced on a negative electrode surface, and a reduction product deteriorates performance of the SEI film of the negative electrode, resulting in deterioration of cycling performance of the electrochemical apparatus.

Therefore, this application may use a method of pre-lithiating the negative electrode and performing electrolyte injection and formation in stages. An electrolyte injected for the first time includes a fluorine-containing compound without nitrile compound, and a stable SEI film is first formed on the negative electrode surface. An electrolyte injected for the second time includes a fluorine-containing compound and a nitrile compound, and a CEI film is formed on a surface of the positive electrode. The electrolytes are added in two times, and the first electrolyte includes no nitrile compound. This avoids a reduction reaction of the nitrile compound on the surface of the negative electrode to affect formation of the SEI film, and implements separate regulation of the SEI film of the negative electrode and the CEI film of the positive electrode, thereby reducing deterioration of the SEI film of the negative electrode by the nitrile compound, and obtaining the stable CEI film of the positive electrode and the stable SEI film of the negative electrode. The formed SEI film of the negative electrode contains a negative electrode film-forming additive FEC and thereby contains fluorine, and the formed CEI film of the positive electrode contains a positive electrode film-forming additive nitrile compound and thereby contains nitrogen. In this way, the stable CEI film of the positive electrode and the stable SEI film of the negative electrode are obtained, thereby implementing a proper mass ratio of fluorine to nitrogen on a surface layer of the positive electrode active material layer and a proper mass ratio of fluorine to nitrogen on a surface layer of the negative electrode active material layer.

In some embodiments, a mass ratio of fluorine to nitrogen on the surface layer of the positive electrode active material layer 102 is A, and $3 \leq A \leq 50$. In some embodiments, the surface layer of the positive electrode active material layer 102 is a cathode electrolyte interphase (CEI) film formed on a surface of the positive electrode active material layer 102.

In some embodiments, the fluorine-containing compound containing fluorine in the electrolyte may help form a stable anode solid electrolyte interphase (SEI) film on the negative electrode surface, and the nitrile compound containing nitrogen in the electrolyte may help form a stable CEI film on the positive electrode surface. However, the nitrile compound containing nitrogen is easily reduced on the negative electrode surface, and a reduction product deteriorates stability of the SEI film on the negative electrode surface, resulting in damage to cycling performance of the electrochemical apparatus. When A is excessively small, for example, less than 3, it indicates that there is an excessively small amount of fluorine-containing compound or an excessively large amount of nitrile compound, which is not conducive to formation of the stable SEI film on the negative electrode surface, and the excessive nitrile compound may be reduced on the surface of the negative electrode and deteriorate stability of the SEI film on the negative electrode surface. When A is excessively large, for example, greater than 50, it indicates that there is an excessively small amount of nitrile compound or an excessively large amount of fluorine-containing compound, which is not conducive to formation of the stable CEI film on the positive electrode surface. In addition, the fluorine-containing compound has poor oxidation resistance, and the excessive fluorine-containing compound is easily oxidized at the high-voltage positive electrode, deteriorating performance of the positive electrode. In addition, the insufficient nitrile compound makes it impossible to effectively protect stability of the CEI film on the positive electrode surface, and also causes the high-voltage positive electrode to fail.

In some embodiments, a mass ratio of fluorine to nitrogen on the surface layer of the negative electrode active material layer 122 is B, and $30 \leq B \leq 300$. When B is excessively small, for example, less than 30, it indicates that there is an excessively small amount of fluorine-containing compound or an excessively large amount of nitrile compound, which is not conducive to formation of the stable SEI film on the negative electrode surface, and the excessive nitrile compound may be reduced on the surface of the negative electrode and deteriorate stability of the SEI film on the negative electrode surface. When B is excessively large, for example, greater than 300, it indicates that there is an excessively small amount of nitrile compound or an excessively large amount of fluorine-containing compound, which is not conducive to formation of the stable CEI film on the positive electrode surface, and the excessive fluorine-containing compound is easily oxidized at the high-voltage positive electrode, deteriorating the performance of the positive electrode. In addition, the insufficient nitrile compound makes it impossible to effectively protect stability of the CEI film on the positive electrode surface, and also causes the high-voltage positive electrode to fail.

In some embodiments, to implement that a mass ratio of fluorine to nitrogen on a surface layer of the positive electrode active material layer 102 is A, a mass ratio of fluorine to nitrogen on a surface layer of the negative electrode active material layer 122 is B, $3 \leq A \leq 50$, and $30 \leq B \leq 300$, electrolytes may be injected in two times. The electrolyte injected for the first time includes a fluorine-containing compound without nitrile compound, and a stable SEI film is first formed on the negative electrode surface. Then, the second electrolyte including a fluorine-containing compound and a nitrile compound is injected, and a CEI film is formed on the positive electrode surface. The electrolytes are added in two times, and no nitrile compound is included in the first electrolyte. This avoids that reduction reaction of the nitrile compound on the surface of the negative electrode affects formation of the SEI film and leads to a failure in obtaining the stable SEI film and a failure in implementing $3 \leq A \leq 50$ and $30 \leq B \leq 300$.

In some embodiments, $20 \leq A \leq 50$, and $70 \leq B \leq 300$. By making $20 \leq A \leq 50$ and $70 \leq B \leq 300$, a cycling retention rate after 300 cycles at 25° C. is relatively high, generally 90% or above.

In some embodiments, $2 \leq B/A \leq 10$. A cycling retention rate of the electrochemical apparatus is improved by making $2 \leq B/A \leq 10$. In some embodiments, $3.30 \leq B/A \leq 3.90$. In some embodiments, $5.90 \leq B/A \leq 8.10$. By making $3.30 \leq B/A \leq 3.90$ and $5.90 \leq B/A \leq 8.10$, a cycling retention rate after 300 cycles at 25° C. of the electrochemical apparatus is high, generally 90% or above.

In some embodiments, a thicknesses of the surface layer of the positive electrode active material layer 102 is 10 nm, and a thickness of the surface layer of the negative electrode active material layer 122 is 10 nm. As described above, the surface layer of the positive electrode active material layer 102 is the CEI film formed on the positive electrode surface, and the surface layer of the negative electrode active material layer 122 is the SEI film formed on the negative electrode surface. When the thicknesses of the surface layer of the positive electrode active material layer 102 and the surface layer of the negative electrode active material layer 122 are 10 nm, side reactions between the electrolyte and the positive electrode active material layer or the negative electrode active material layer may be reduced, and penetration of lithium ions can also be guaranteed.

In some embodiments, the surface layer of the positive electrode active material layer 102 includes no positive electrode active material. As described above, the surface layer of the positive electrode active material layer 102 is a product formed by the reaction of the electrolyte with the positive electrode active material, but not the positive electrode active material. In some embodiments, the surface layer of the negative electrode active material layer 122 includes no negative electrode active material. As described above, the surface layer of the negative electrode active material layer 122 is a product formed by the reaction of the electrolyte with the negative electrode active material, but not the negative electrode active material.

In some embodiments, the electrochemical apparatus further includes an electrolyte, and the electrolyte includes at least one of a fluorine-containing compound or a nitrile compound. In some embodiments, the fluorine-containing compound may help form the stable SEI film on the negative electrode surface, and the nitrile compound may help form the stable CEI film on the positive electrode surface.

In some embodiments, the fluorine-containing compound includes at least one of fluoroethylene carbonate, trifluoropropylene carbonate, trifluoroethyl methyl carbonate, fluorocarboxylate, or fluoroether. In some embodiments, the nitrile compound includes at least one of a mononitrile compound, a dinitrile compound, or a trinitrile compound. In some embodiments, the mononitrile compound is a compound including one —CN group, the dinitrile compound is a compound including two —CN groups, and the trinitrile compound is a compound including three —CN groups. In some embodiments, the mononitrile compound includes at least one of acetonitrile or p-methylbenzonitrile. In some embodiments, the dinitrile compound includes at least one of malononitrile, succinonitrile, hexanedinitrile, pentanedinitrile, octanedinitrile, or sebaconitrile. In some embodiments, the trinitrile compound includes at least one of hexanetrinitrile or 1,3,5-pentanetricarbonitrile.

In some embodiments, based on a mass of the electrolyte, a mass percentage of the fluorine-containing compound in the electrolyte ranges from 5% to 40%. If a percentage of the fluorine-containing compound is excessively low, for example, lower than 5%, the stable SEI film may not be able to be formed on the negative electrode surface, or the damaged SEI film cannot be repaired in a timely manner during cycling, thereby affecting cycling performance of the electrochemical apparatus. If a percentage of the fluorine-containing compound is excessively high, for example, higher than 40%, the fluorine-containing compound may be oxidized at the high-voltage positive electrode, deteriorating performance of the positive electrode.

In some embodiments, based on the mass of the electrolyte, a mass percentage of the nitrile compound in the electrolyte is 1% to 6%. If a percentage of the nitrile compound is excessively low, for example, lower than 1%, it may not have a good protective effect on the positive electrode, that is, the stable CEI film cannot be formed on the positive electrode surface. If a percentage of the nitrile compound is excessively high, for example, higher than 6%, the excessively large amount of nitrile compound may have a reduction reaction on the negative electrode surface, and a reduction product deteriorates stability of the SEI film on the negative electrode surface, thereby affecting cycling performance of the electrochemical apparatus.

In some embodiments, the negative electrode sheet 12 includes the negative electrode active material, the negative electrode active material includes a silicon material, and the silicon material includes at least one of silicon, a silicon-oxygen compound, a silicon-carbon compound, or a silicon alloy. A nitrile compound additive in the electrolyte is easily reduced on a surface of a silicon negative electrode, and a reduction product may deteriorate performance of the SEI film, thereby accelerating cycling degradation of the silicon negative electrode. The stable SEI film is formed on the surface of the silicon negative electrode by pre-lithiating the negative electrode and injecting the electrolyte containing no nitrile compound additive for the first time and the electrolyte containing the nitrile compound additive for the second time during formation.

In some embodiments, the positive electrode active material layer 102 includes the positive electrode active material, the positive electrode active material includes at least one of a lithium cobalt oxide, a lithium nickel cobalt manganese oxide, or a lithium nickel cobalt aluminum oxide, and when a state of charge (SOC) of the electrochemical apparatus is 100%, an open-circuit voltage of the electrochemical apparatus is greater than or equal to 4.15 V. In some embodiments, the positive electrode active material includes the lithium cobalt oxide, and when the SOC of the electrochemical apparatus is 100%, the open-circuit voltage of the electrochemical device is greater than or equal to 4.35 V. In other words, this embodiment of this application is applicable to the high-voltage positive electrode. Generally, for ternary positive electrode active materials such as lithium nickel cobalt manganese oxide and lithium nickel cobalt aluminum oxide, 4.15 V or higher may be considered a high voltage. For the positive electrode active material such as lithium cobalt oxide, 4.35 V or higher may be considered a high voltage.

In some embodiments, the current collector 121 of the negative electrode sheet 12 may include at least one of copper foil, aluminum foil, nickel foil, or a carbon-based current collector. In some embodiments, the negative electrode active material layer 122 may further include a conductive agent and/or a binder. In some embodiments, the conductive agent includes at least one of conductive carbon black, acetylene black, carbon nanotubes, Ketjen black, conductive graphite, or graphene. In some embodiments, a mass percentage of the conductive agent in the negative electrode active material layer 122 ranges from 0.5% to 10%. In some embodiments, the binder includes at least one of polyvinylidene fluoride, a vinylidene fluoride-hexafluoropropylene copolymer, polyamide, polyacrylonitrile, polyropylene, polyacrylic acid, poly acrylate, sodium carboxymethylcellulose, polyvinylpyrrolidone, polyvinyl ether, polymethyl methacrylate, polytetrafluoroethylene, polyhexafluoropropylene, or styrene-butadiene rubber. In some embodiments, a mass percentage of the binder in the negative electrode active material layer 122 ranges from 0.5% to 10%. It should be understood that the above is merely an example and not intended to limit this application.

In some embodiments, the positive electrode active material layer 102 may include a positive electrode active material, a conductive agent, and a binder. The positive electrode current collector 101 may use Al foil, or may use another positive electrode current collector commonly used in the art. The conductive agent in the positive electrode sheet 10 may include at least one of conductive carbon black, laminated graphite, graphene, carbon nanotubes, or carbon fiber. The binder in the positive electrode sheet 10 may include at least one of polyvinylidene fluoride, a vinylidene fluoride-hexafluoropropylene copolymer, styrene-acrylate copolymer, styrene-butadiene copolymer, polyamide, polyacrylonitrile, polyacrylate, polyacrylic acid, polyacrylate, sodium carboxymethylcellulose, polyvinyl acetate, polyvinylpyrrolidone, polyvinyl ether, polymethyl methacrylate, polytetrafluoroethylene, or polyhexafluoropropylene. The positive electrode active material includes, but is not limited to, at least one of lithium cobaltate, lithium nickelate, lithium manganate, lithium nickel manganate, lithium iron phosphate, lithium nickel cobalt aluminate, or lithium nickel cobalt manganate. The foregoing positive electrode active material may be doped or coated.

In some embodiments, the separator 11 includes at least one of polyethylene, polypropylene, polyvinylidene fluoride, polyethylene terephthalate, polyimide, or aramid. For example, polyethylene includes at least one of high-density polyethylene, low-density polyethylene, or ultra-high-molecular-weight polyethylene. In particular, polyethylene and polypropylene can well prevent a short circuit, and can improve stability of a battery through a turn-off effect. In some embodiments, a thickness of the separator ranges from approximately 5 μm to 500 μm.

In some embodiments, a surface of the separator may further include a porous layer. The porous layer is disposed on at least one surface of the separator and includes inorganic particles and a binder, where the inorganic particles are selected from at least one of aluminum oxide ($Al_2O_3$), silicon oxide ($SiO_2$), magnesium oxide (MgO), titanium oxide ($TiO_2$), hafnium oxide ($HfO_2$), stannic oxide ($SnO_2$), cerium dioxide ($CeO_2$), nickel oxide (NiO), zinc oxide (ZnO), calcium oxide (CaO), zirconium oxide ($ZrO_2$), yttrium oxide ($Y_2O_3$), silicon carbide (SiC), boehmite, aluminum hydroxide, magnesium hydroxide, calcium hydroxide, or barium sulfate. In some embodiments, pores of the separator have a diameter of approximately 0.01 μm to 1 μm. The binder is selected from at least one of polyvinylidene fluoride, a vinylidene fluoride-hexafluoropropylene copolymer, polyamide, polyacrylonitrile, polyacrylate, polyacrylic acid, poly acrylate, sodium carboxymethylcellulose, polyvinylpyrrolidone, polyvinyl ether, polymethyl methacrylate, polytetrafluoroethylene, or polyhexafluoropropylene. The porous layer on the surface of the separator can improve heat resistance, oxidation resistance, and electrolyte infiltration performance of the separator, enhancing adhesion between the separator and an electrode sheet.

In some embodiments, the electrochemical apparatus includes a lithium-ion battery. However, this application is not limited thereto. In some embodiments, the electrolyte may further include at least two of dimethyl carbonate (DMC), ethyl methyl carbonate (EMC), diethyl carbonate (DEC), ethylene carbonate (EC), propylene carbonate (PC), or propyl propionate (PP). In addition, the electrolyte may further additionally include at least one of vinylene carbonate (VC) or a dinitrile compound serving as an electrolyte additive. In some embodiments, the electrolyte may further include a lithium salt.

In some embodiments of this application, a lithium-ion battery is used as an example. A positive electrode sheet, a separator, and a negative electrode sheet are wound or stacked in sequence to form an electrode assembly, the electrode assembly is then packaged, for example, in an aluminum-plastic film and the negative electrode is pre-lithiated, followed by injection of an electrolyte, formation, and packaging, so that the lithium-ion battery is prepared. Those skilled in the art will understand that a preparation method for the electrochemical apparatus (for example, a lithium-ion battery) described above is merely an embodiment. Without departing from the content disclosed in this application, other methods commonly used in the art may be adopted.

In some embodiments, an embodiment of this application further provides a preparation method for an electrochemical apparatus. As described above, the electrochemical apparatus includes the positive electrode sheet 10, the negative electrode sheet 12, and the separator 11, where the separator 11 is disposed between the positive electrode sheet 10 and the negative electrode sheet 12. The preparation method includes pre-lithiating the negative electrode sheet. Specifically, a layer of lithium metal may be provided on a surface of the negative electrode active material layer 122 facing away from the negative electrode current collector 121. In some embodiments, the negative electrode sheet (especially the negative electrode sheet including a silicon-based material) itself has low first cycle efficiency, and the first cycle efficiency of the corresponding electrochemical apparatus can be improved through pre-lithiation.

Then, a first electrolyte is added to the electrochemical apparatus for first formation, where the first electrolyte includes a fluorine-containing compound without nitrile compound. In this case, because the surface of the negative electrode active material layer 122 facing away from the negative electrode current collector 121 includes lithium metal, the SEI film can be formed on the surface of the negative electrode after injection without additional charging formation, reducing process costs. In addition, in this case, no CEI film has been formed on the positive electrode surface. Because the first electrolyte includes no nitrile compound, when the fluorine-containing compound facilitates formation of the SEI film on the negative electrode surface, no nitrile compound is reduced at the negative electrode. Therefore, the formation of the SEI film is not damaged.

Then, a second electrolyte is added to the electrochemical apparatus for second formation, where the second electrolyte includes a fluorine-containing compound and a nitrile compound. In this case, charging and formation can be performed to form the CEI film on the positive electrode surface. Films are formed separately at the positive electrode and the negative electrode, the stable SEI film and the stable CEI film are formed. Finally, a mass ratio of fluorine to nitrogen on a surface layer of the positive electrode sheet 10 is A, a mass ratio of fluorine to nitrogen on a surface layer of the negative electrode sheet 12 is B, $3 \leq A \leq 50$, and $30 \leq B \leq 300$. If the films are not formed separately, the formation of the SEI film on the surface of the negative electrode may be damaged by the nitrile compound, and $3 \leq A \leq 50$ and $30 \leq B \leq 300$ cannot be ensured.

In some embodiments, the fluorine-containing compound includes at least one of fluoroethylene carbonate, trifluoropropylene carbonate, trifluoroethyl methyl carbonate, fluorocarboxylate, or fluoroether. In some embodiments, the nitrile compound includes at least one of a mononitrile compound, a dinitrile compound, or a trinitrile compound. In some embodiments, the mononitrile compound includes at least one of acetonitrile or p-methylbenzonitrile. In some embodiments, the dinitrile compound includes at least one of malononitrile, succinonitrile, hexanedinitrile, pentanedinitrile, octanedinitrile, or sebaconitrile. In some embodiments, the trinitrile compound includes at least one of hexanetrinitrile or 1,3,5-pentanetricarbonitrile.

An embodiment of this application further provides an electronic apparatus including the electrochemical apparatus described above. The electronic apparatus according to this embodiment of this application is not particularly limited, and may be any known electronic apparatus used in the prior art. In some embodiments, the electrochemical apparatus may include, but is not limited to, a notebook computer, a pen-input computer, a mobile computer, an electronic book player, a portable telephone, a portable fax machine, a portable copier, a portable printer, a stereo headset, a video recorder, a liquid crystal television, a portable cleaner, a portable CD player, a mini-disc, a transceiver, an electronic notebook, a calculator, a memory card, a portable recorder, a radio, a standby power source, a motor, an automobile, a motorcycle, a motor bicycle, a bicycle, a lighting appliance, a toy, a game console, a clock, an electric tool, a flash lamp, a camera, a large household battery, a lithium-ion capacitor, or the like.

Some specific examples and comparative examples are listed below to better illustrate this application. Lithium-ion batteries are used for illustration.

EXAMPLE 1

Preparation of a negative electrode sheet: A current collector used copper foil with a thickness of 8 μm; a negative electrode active material used SiO (20 wt %, a mass percentage, the same below) and graphite (80 wt %), a conductive agent used conductive carbon black, and a binder used polyacrylic acid and sodium carboxymethyl cellulose; and the negative electrode active material, conductive carbon black, polyacrylic acid, and sodium carboxymethyl cellulose were mixed in a weight ratio of 92:2:5:1, and then dispersed in deionized water to form a slurry, and the slurry was uniformly agitated and then applied onto the copper foil, followed by drying to form a negative electrode active material layer. A coating weight of the negative electrode active material layer is 5.9 mg/cm$^2$. After drying and cold pressing (with compacted density of 1.5 g/cm$^3$), a negative electrode sheet was obtained. The negative electrode sheet was pre-lithiated by using lithium metal rolling compositing.

Preparation of a positive electrode sheet: A positive electrode active material LiCoO$_2$, conductive carbon black, and a binder polyvinylidene fluoride (PVDF) were fully agitated and uniformly mixed in an N-methylpyrrolidone solvent system in a mass ratio of 96:1:3, then the mixture was applied onto aluminum foil with a coating weight of 18.2 mg/cm$^2$, followed by drying and cold pressing (with compacted density of 4.1 g/cm$^3$), and a positive electrode sheet was obtained.

Preparation of a separator: 10 μm thick polyethylene was used.

Preparation of an electrolyte: Under an environment with a water content lower than 10 ppm, lithium hexafluorophosphate (1 mol/L) and a non-aqueous organic solvent (ethylene carbonate (EC): propylene carbonate (PC): diethyl carbonate (DEC): dimethyl carbonate (DMC)=20:20:40:20, a weight ratio) were mixed to obtain a basic electrolyte. 20 wt % fluoroethylene carbonate (FEC) was added to an electrolyte 1, and 5 wt % FEC and 1 wt % succinonitrile were added to an electrolyte 2.

Preparation of a lithium-ion battery: The positive electrode sheet, the separator, and the negative electrode sheet were stacked in sequence, so that the separator was disposed between the positive electrode sheet and the negative electrode sheet for separation, and winding was performed to obtain an electrode assembly. The electrode assembly was placed in an outer packaging aluminum-plastic film, and was dehydrated at a temperature of 80° C. Then the foregoing electrolyte was injected and packaged, followed by processes such as formation, degassing, and shaping, and a lithium-ion battery was obtained. The battery has a thickness of 3.5 mm, a width of 40 mm, and a length of 95 mm. In the preparation process, a 3 g electrolyte 1 was injected first, where the electrolyte 1 includes 20 wt % FEC without nitrile compound; then the electrolyte was left standing at room temperature for 48 hours to form a SEI film through formation, and vacuum degassing and removal of an excessive electrolyte were performed; then a 6 g electrolyte 2 was injected, where the electrolyte 2 includes 5 wt % FEC and 1 wt % succinonitrile; and after the electrolyte was left standing for 48 hours, formation, vacuum degassing and electrolyte removal (removal of an excessive electrolyte), and grading were performed. The process of formation was charging to 3.9 V at a constant current of 0.1 C at 45° C. with a pressure of 0.3 MPa; the process of grading was charging to 4.45 V (upper limit voltage) at a constant current of 0.7 C at 25° C., charging to a cut-off current of 0.025 C at a constant voltage, and then discharging to 3.0 V at 0.5 C.

In Examples 2 to 19 and Comparative Examples 4 to 16, the preparation of the positive electrode sheet, the preparation of the separator, the preparation of the negative electrode sheet, and the preparation of the lithium-ion battery were the same as those in Example 1, except that there were some differences in the preparation of the electrolyte. Differences in parameters are shown in the corresponding Table 1 below.

In Comparative Example 1, electrolyte injection in stages was not used, only the electrolyte 2 was injected for corresponding formation, and the electrolyte 2 was added with 20 wt % FEC.

In Comparative Example 2, electrolyte injection in stages was not used, only the electrolyte 2 was injected for corresponding formation, and the electrolyte 2 was added with 20 wt % FEC and 1 wt % succinonitrile.

In Comparative Example 3, electrolyte injection in stages was not used, only the electrolyte 2 was injected for corresponding formation, and the electrolyte 2 was added with 20 wt % FEC and 6 wt % succinonitrile.

In Examples 20 and 21 and Comparative Example 17, the preparation of the positive electrode sheet, the preparation of the separator, the preparation of the negative electrode sheet, and the preparation of the lithium-ion battery were the same as those in Example 1, except that the FEC was replaced by trifluoropropylene carbonate, and the nitrile compound was still succinonitrile. Differences in parameters are shown in the corresponding Table 2 below.

In Examples 22 and 23 and Comparative Example 18, the preparation of the positive electrode sheet, the preparation of the separator, the preparation of the negative electrode sheet, and the preparation of the lithium-ion battery were the same as those in Example 1, except that the FEC was replaced by trifluoroethyl methyl carbonate, and the nitrile compound was still succinonitrile. Differences in parameters are shown in the corresponding Table 2 below.

In Examples 24 and 25 and Comparative Example 19, the preparation of the positive electrode sheet, the preparation of the separator, the preparation of the negative electrode sheet, and the preparation of the lithium-ion battery are the same as those in Example 1, except that the FEC was replaced by ethyl difluoroacetate, and the nitrile compound was still succinonitrile. Differences in parameters are shown in the corresponding Table 2 below.

In Examples 26 and 27 and Comparative Example 20, the preparation of the positive electrode sheet, the preparation of the separator, the preparation of the negative electrode sheet, and the preparation of the lithium-ion battery were the same as those in Example 1, except that the FEC was replaced by 1,1,2,2-tetrafluoroethyl -2,2,3,3-tetrafluoropropyl ether, and the nitrile compound was still succinonitrile. Differences in parameters are shown in the corresponding Table 2 below.

In Examples 28 and 29 and Comparative Example 21, the preparation of the positive electrode sheet, the preparation of the separator, the preparation of the negative electrode sheet, and the preparation of the lithium-ion battery were the same as those in Example 1, except that the negative electrode film-forming additive was still FEC, and the nitrile compound succinonitrile was replaced by malononitrile. Differences in parameters are shown in the corresponding Table 2 below.

In Examples 30 and 31 and Comparative Example 22, the preparation of the positive electrode sheet, the preparation of the separator, the preparation of the negative electrode sheet, and the preparation of the lithium-ion battery were the same as those in Example 1, except that the negative electrode film-forming additive was still FEC, and the nitrile compound succinonitrile was replaced by hexanedinitrile. Differences in parameters are shown in the corresponding Table 2 below.

In Examples 32 and 33 and Comparative Example 23, the preparation of the positive electrode sheet, the preparation of the separator, the preparation of the negative electrode sheet, and the preparation of the lithium-ion battery were the same as those in Example 1, except that the negative electrode film-forming additive was still FEC, and the nitrile compound succinonitrile was replaced by pentanedinitrile. Differences in parameters are shown in the corresponding Table 2 below.

In Examples 34 and 35 and Comparative Example 24, the preparation of the positive electrode sheet, the preparation of the separator, the preparation of the negative electrode sheet, and the preparation of the lithium-ion battery were the same as those in Example 1, except that the negative electrode film-forming additive was still FEC, and the nitrile compound succinonitrile was replaced by octanedinitrile. Differences in parameters are shown in the corresponding Table 2 below.

In Examples 36 and 37 and Comparative Example 25, the preparation of the positive electrode sheet, the preparation of the separator, the preparation of the negative electrode sheet, and the preparation of the lithium-ion battery were the same as those in Example 1, except that the negative electrode film-forming additive was still FEC, and the nitrile compound succinonitrile was replaced by sebaconitrile. Differences in parameters are shown in the corresponding Table 2 below.

In Examples 38 and 39 and Comparative Example 26, the preparation of the positive electrode sheet, the preparation of the separator, the preparation of the negative electrode sheet, and the preparation of the lithium-ion battery were the same as those in Example 1, except that the negative electrode film-forming additive was still FEC, and the nitrile compound succinonitrile was replaced by hexanetrinitrile. Differences in parameters are shown in the corresponding Table 2 below.

In Examples 40 and 41 and Comparative Example 27, the preparation of the positive electrode sheet, the preparation of the separator, the preparation of the negative electrode sheet, and the preparation of the lithium-ion battery were the same as those in Example 1, except that the negative electrode film-forming additive was still FEC, and the nitrile compound succinonitrile was replaced by 1,3,5-pentanetricarbonitrile. Differences in parameters are shown in the corresponding Table 2 below.

Methods for measuring various performance parameters in Examples and Comparative Examples are as follows.
Elemental Analysis of a Surface Layer of an Active Material Layer:

XPS (X-ray photoelectron spectroscopy) was used to analyze elements on a surface of an electrode sheet of a lithium-ion battery after grading. MgKa (1253.6 eV) and AlKa (1486.6 eV) targets were used to generate X-rays. PHI 5500 XPS (X-ray photoelectron spectroscopy with a detection depth of 10 nm) was used to analyze elemental composition on a positive electrode surface and a negative electrode surface after grading (discharging to 2.5 V at 0.2 C was performed, and a 10 mm×10 mm sample electrode sheet was randomly taken to be soaked in dimethyl carbonate (DMC) for 30 min). Ten different regions of silicon-based negative electrode particles were randomly tested (F1s 686±5 eV, N1s 400±5 eV elements). The element composition was an average value based on ten test results.

Cycling Performance Test:

At temperatures of 25° C. and 45° C., respectively, the charging process was charging to 4.45 V at a constant current of 0.7 C, charging to a cut-off current of 0.025 C at a constant voltage, and then discharging to 3.0 V at 0.5 C. With a discharge capacity in the first cycle being 100%, a capacity retention rate of the lithium ion battery after 300 cycles was recorded.

A mass ratio of fluorine to nitrogen on a surface layer of the positive electrode active material layer was a, and a mass ratio of fluorine to nitrogen on a surface layer of the negative electrode active material layer was b.

Table 1 shows various parameters and evaluation results in Examples 1 to 19 and Comparative Examples 1 to 16.

TABLE 1

| Group | Percentage (wt %) of FEC in electrolyte 1 | Total percentage (wt %) of nitrile compound in electrolyte 1 | Percentage (wt %) of FEC in electrolyte 2 | Total percentage (wt %) of nitrile compound in electrolyte 2 | B | A | B/A | Capacity retention rate after 300 cycles at 25° C. | Capacity retention rate after 300 cycles at 45° C. |
|---|---|---|---|---|---|---|---|---|---|
| Comparative Example 1 | / | / | 20 | 0 | No nitrogen | No nitrogen | No fluorine | 81% | 58% |
| Comparative Example 2 | / | / | 20 | 1 | 19 | 14 | 1.36 | 77% | 75% |
| Comparative Example 3 | / | / | 20 | 6 | 7 | 6 | 1.17 | 73% | 72% |
| Comparative Example 4 | 20 | 1 | 5 | 1 | 12 | 15 | 0.80 | 75% | 71% |
| Comparative Example 5 | 20 | 1 | 40 | 1 | 27 | 30 | 0.90 | 81% | 73% |
| Comparative Example 6 | 20 | 6 | 5 | 1 | 8 | 17 | 0.47 | 72% | 70% |
| Comparative Example 7 | 20 | 6 | 40 | 1 | 22 | 22 | 1.00 | 80% | 73% |
| Comparative Example 8 | 20 | 1 | 5 | 6 | 7 | 4 | 1.75 | 74% | 74% |
| Comparative Example 9 | 20 | 1 | 40 | 6 | 25 | 20 | 1.25 | 80% | 72% |
| Comparative Example 10 | 20 | 6 | 5 | 6 | 6 | 4 | 1.5 | 71% | 69% |
| Comparative Example 11 | 20 | 6 | 40 | 6 | 20 | 18 | 1.11 | 79% | 74% |
| Example 1 | 20 | 0 | 5 | 1 | 54 | 21 | 2.57 | 89% | 86% |
| Example 2 | 20 | 0 | 10 | 1 | 166 | 27 | 6.15 | 90% | 85% |
| Example 3 | 20 | 0 | 20 | 1 | 295 | 37 | 7.97 | 90% | 85% |
| Comparative Example 12 | 20 | 0 | 30 | 1 | 522 | 51 | 10.23 | 92% | 75% |
| Comparative Example 13 | 20 | 0 | 40 | 1 | 689 | 54 | 12.76 | 93% | 74% |
| Example 4 | 20 | 0 | 5 | 2 | 51 | 14 | 3.64 | 88% | 87% |
| Example 5 | 20 | 0 | 10 | 2 | 118 | 20 | 5.90 | 90% | 86% |
| Example 6 | 20 | 0 | 20 | 2 | 221 | 34 | 6.50 | 90% | 86% |
| Example 7 | 20 | 0 | 30 | 2 | 267 | 40 | 6.68 | 91% | 85% |
| Comparative Example 14 | 20 | 0 | 40 | 2 | 531 | 52 | 10.21 | 92% | 74% |
| Example 8 | 20 | 0 | 5 | 4 | 47 | 11 | 4.27 | 88% | 86% |
| Example 9 | 20 | 0 | 10 | 4 | 102 | 18 | 5.67 | 89% | 87% |
| Example 10 | 20 | 0 | 20 | 4 | 178 | 26 | 6.85 | 89% | 86% |
| Example 11 | 20 | 0 | 30 | 4 | 216 | 27 | 8.00 | 90% | 86% |
| Example 12 | 20 | 0 | 40 | 4 | 251 | 31 | 8.10 | 91% | 86% |
| Comparative Example 15 | 20 | 0 | 5 | 6 | 19 | 2 | 9.50 | 82% | 78% |
| Comparative Example 16 | 20 | 0 | 10 | 6 | 20 | 2 | 10.00 | 82% | 78% |
| Example 13 | 20 | 0 | 20 | 6 | 30 | 3 | 10.00 | 89% | 87% |
| Example 14 | 20 | 0 | 30 | 6 | 76 | 9 | 8.44 | 89% | 88% |
| Example 15 | 20 | 0 | 40 | 6 | 92 | 10 | 9.20 | 89% | 87% |
| Example 16 | 5 | 0 | 20 | 2 | 78 | 20 | 3.90 | 90% | 86% |
| Example 17 | 10 | 0 | 20 | 2 | 80 | 22 | 3.64 | 90% | 87% |
| Example 18 | 30 | 0 | 20 | 2 | 86 | 24 | 3.58 | 91% | 87% |
| Example 19 | 40 | 0 | 20 | 2 | 89 | 27 | 3.30 | 91% | 87% |

Table 2 shows various parameters and evaluation results in Examples 20 to 41 and Comparative Examples 17 to 27.

TABLE 2

| Group | Percentage (wt %) of FEC in electrolyte 1 | Total percentage (wt %) of nitrile compound in electrolyte 1 | Percentage (wt %) of FEC in electrolyte 2 | Total percentage (wt %) of nitrile compound in electrolyte 2 | B | A | B/A | Capacity retention rate after 300 cycles at 25° C. | Capacity retention rate after 300 cycles at 45° C. |
|---|---|---|---|---|---|---|---|---|---|
| Comparative Example 17 | 20 | 1 | 5 | 1 | 7 | 9 | 0.78 | 62% | 61% |
| Example 20 | 20 | 0 | 5 | 1 | 38 | 18 | 2.11 | 83% | 82% |
| Example 21 | 20 | 0 | 20 | 6 | 34 | 4 | 8.50 | 86% | 85% |
| Comparative Example 18 | 20 | 1 | 5 | 1 | 10 | 15 | 0.67 | 58% | 55% |
| Example 22 | 20 | 0 | 5 | 1 | 44 | 21 | 2.10 | 82% | 81% |
| Example 23 | 20 | 0 | 20 | 6 | 39 | 4 | 9.75 | 83% | 80% |
| Comparative Example 19 | 20 | 1 | 5 | 1 | 6 | 11 | 0.55 | 68% | 63% |
| Example 24 | 20 | 0 | 5 | 1 | 31 | 12 | 2.58 | 87% | 82% |
| Example 25 | 20 | 0 | 20 | 6 | 33 | 7 | 4.71 | 88% | 86% |
| Comparative Example 20 | 20 | 1 | 5 | 1 | 4 | 22 | 0.18 | 60% | 52% |
| Example 26 | 20 | 0 | 5 | 1 | 51 | 25 | 2.04 | 82% | 81% |
| Example 27 | 20 | 0 | 20 | 6 | 59 | 7 | 8.43 | 85% | 84% |
| Comparative Example 21 | 20 | 1 | 5 | 1 | 18 | 22 | 0.82 | 52% | 50% |
| Example 28 | 20 | 0 | 5 | 1 | 55 | 23 | 2.39 | 82% | 80% |
| Example 29 | 20 | 0 | 20 | 6 | 64 | 21 | 3.05 | 81% | 87% |
| Comparative Example 22 | 20 | 1 | 5 | 1 | 6 | 17 | 0.35 | 63% | 62% |
| Example 30 | 20 | 0 | 5 | 1 | 33 | 16 | 2.06 | 84% | 82% |
| Example 31 | 20 | 0 | 20 | 6 | 28 | 4 | 7.00 | 88% | 83% |
| Comparative Example 23 | 20 | 1 | 5 | 1 | 6 | 9 | 0.67 | 56% | 55% |
| Example 32 | 20 | 0 | 5 | 1 | 45 | 15 | 3.00 | 83% | 81% |
| Example 33 | 20 | 0 | 20 | 6 | 56 | 6 | 9.33 | 86% | 83% |
| Comparative Example 24 | 20 | 1 | 5 | 1 | 4 | 10 | 0.40 | 60% | 58% |
| Example 34 | 20 | 0 | 5 | 1 | 30 | 13 | 2.31 | 82% | 80% |
| Example 35 | 20 | 0 | 20 | 6 | 45 | 5 | 9.00 | 83% | 80% |
| Comparative Example 25 | 20 | 1 | 5 | 1 | 7 | 19 | 0.37 | 63% | 60% |
| Example 36 | 20 | 0 | 5 | 1 | 66 | 31 | 2.13 | 84% | 81% |
| Example 37 | 20 | 0 | 20 | 6 | 44 | 8 | 5.50 | 85% | 82% |
| Comparative Example 26 | 20 | 1 | 5 | 1 | 8 | 16 | 0.50 | 59% | 52% |
| Example 38 | 20 | 0 | 5 | 1 | 44 | 19 | 2.32 | 85% | 82% |
| Example 39 | 20 | 0 | 20 | 6 | 38 | 5 | 7.60 | 87% | 82% |
| Comparative Example 27 | 20 | 1 | 5 | 1 | 5 | 16 | 0.31 | 67% | 63% |
| Example 40 | 20 | 0 | 5 | 1 | 32 | 16 | 2.00 | 84% | 80% |
| Example 41 | 20 | 0 | 20 | 6 | 36 | 5 | 7.20 | 88% | 84% |

In Comparative Examples 1 to 3, the films were not separately formed at the positive and negative electrodes. Comparative Example 1 did not include the nitrile compound, causing the high-voltage positive electrode to fail, and especially at 45° C., the capacity retention rate was low. In Comparative Examples 2 and 3, although the nitrile compound was added, the nitrile compound deteriorated stability of the SEI film on the negative electrode surface, causing poor cycling performance. In Comparative Examples 4 to 11, although the films were separately formed at the positive and negative electrodes, the electrolyte 1 including the nitrile compound still deteriorated the SEI film on the negative electrode surface, affecting cycling performance of the lithium-ion battery. In addition, in Comparative Examples 1 to 11, b was less than 30.

In Examples 1 to 19, the electrolyte 1 included no nitrile compound, and the electrolyte 2 included a nitrile compound. Therefore, the surface layer of the negative electrode active material satisfied 30≤B≤300, and the surface layer of the positive electrode active material satisfied 3≤A≤50. Stability of the SEI film on the surface of the negative electrode and stability of the CEI film on the positive electrode surface were both implemented, and cycling performance of the negative electrode and the high-voltage positive electrode in combination could be kept in a relatively high level.

In Comparative Examples 12 to 16, although films were separately formed at the positive and negative electrodes, and the electrolyte 1 included no nitrile compound, cycling performance at 45° C. in Comparative Examples 12 to 14 was still not ideal, and also cycling degradation at 25° C. in Comparative Examples 15 and 16 was fast. For Comparative Examples 12 to 14, because the electrolyte 2 included excessive FEC, while the nitrile compound was insufficient. It could be learned from elemental analysis that B>300 and A>50. The excessive FEC was easily oxidized at the high-voltage positive electrode, and therefore performance of the positive electrode was deteriorated. The insufficient nitrile compound could not effectively protect stability of the positive electrode surface and caused the high-voltage positive electrode to fail. The failure of the high-voltage positive electrode was more pronounced during the cycling at 45° C., thereby showing fast cycling degradation at 45° C. Comparative Examples 15 and 16 were just the reverse. The percentage of the nitrile compound in the electrolyte 2 was too high, while the percentage of FEC was too low. It could be learned from elemental analysis that B<30 and A<3. The percentage of the nitrile compound was too high, and there was still the nitrile compound reduced on the surface of the negative electrode during SEI repair in the cycling process of the negative electrode, deteriorating the SEI film on the negative electrode surface. However, the insufficient FEC could not effectively repair in a timely manner the SEI film damaged during the cycling, deteriorating cycling of the negative electrode.

In addition, it could be learned from comparison between Examples 1 to 19 and Comparative Examples 1 to 13 that the cycling capacity retention rates at 20° C. and 45° C. were higher by making $2 \leq B/A \leq 10$.

It can be learned from Table 2 that conclusions consistent with the above can be obtained when other fluorine-containing compounds were used to replace FEC and other nitrile compounds were used to replace succinonitrile.

The above descriptions are only preferred embodiments of this application and explanations of the applied technical principles. Those skilled in the art should understand that the scope of disclosure involved in this application is not limited to the technical solutions formed by the specific combination of the above technical features, and should also cover other technical solutions formed by any combination of the above technical features or their equivalent features without departing from the above disclosed concept, for example, the technical solution formed by replacement between the above features and the technical features having similar functions disclosed in this application.

The invention claimed is:

1. An electrochemical apparatus, comprising:
an electrolyte;
a positive electrode sheet comprising a positive electrode active material layer and a surface layer on the positive electrode active material layer;
a negative electrode sheet comprising a negative electrode active material layer and a surface layer on the negative electrode active material layer; and
a separator disposed between the positive electrode sheet and the negative electrode sheet;
wherein the surface layer on the positive electrode active material layer is a stable cathode electrolyte interphase (CEI) film, which is a reaction product formed by the reaction of the electrolyte with a positive electrode active material in the positive electrode active material layer, and the surface layer on the negative electrode active material layer is a stable anode solid electrolyte interphase (SEI) film, which is a reaction product formed by the reaction of the electrolyte with a negative electrode active material in the negative electrode active material layer;
wherein a mass ratio of fluorine to nitrogen in the surface layer on the positive electrode active material layer is A, a mass ratio of fluorine to nitrogen in the surface layer on the negative electrode active material layer is B, and
$3 \leq A \leq 50$, and $30 \leq B \leq 300$ and $2 \leq B/A \leq 10$.

2. The electrochemical apparatus according to claim 1, wherein $20 \leq A \leq 50$, and $70 \leq B \leq 300$.

3. The electrochemical apparatus according to claim 1, wherein $3.30 \leq B/A \leq 3.90$, or $5.90 \leq B/A \leq 8.10$.

4. The electrochemical apparatus according to claim 1, wherein a thicknesses of the surface layer on the positive electrode active material layer is 10 nm, and a thickness of the surface layer on the negative electrode active material layer is 10 nm.

5. The electrochemical apparatus according to claim 1, further comprising an electrolyte, and the electrolyte comprises at least one of a fluorine-containing compound or a nitrile compound.

6. The electrochemical apparatus according to claim 5, wherein
the electrolyte comprises the fluorine-containing compound; and
the fluorine-containing compound comprises at least one of fluoroethylene carbonate, trifluoropropylene carbonate, trifluoroethyl methyl carbonate, fluorocarboxylate, or fluoroether.

7. The electrochemical apparatus according to claim 5, wherein
the electrolyte comprises the nitrile compound; and
the nitrile compound comprises at least one of a mononitrile compound, a dinitrile compound, or a trinitrile compound.

8. The electrochemical apparatus according to claim 7, wherein
the mononitrile compound comprises at least one of acetonitrile or p-methylbenzonitrile;
the dinitrile compound comprises at least one of malononitrile, succinonitrile, hexanedinitrile, pentanedinitrile, octanedinitrile, or sebaconitrile; and
the trinitrile compound comprises at least one of hexanetrinitrile or 1,3,5-pentanetricarbonitrile.

9. The electrochemical apparatus according to claim 1, wherein the negative electrode active material layer comprises a negative electrode active material, the negative electrode active material comprises a silicon material, and the silicon material comprises at least one of:
silicon,
a silicon-oxygen compound,
a silicon-carbon compound, or
a silicon alloy.

10. The electrochemical apparatus according to claim 1, wherein
the positive electrode active material layer comprises a positive electrode active material, and the positive electrode active material comprises at least one of:
a lithium cobalt oxide,
a lithium nickel cobalt manganese oxide, or
a lithium nickel cobalt aluminum oxide; and
when a state of charge of the electrochemical apparatus is 100%, an open-circuit voltage of the electrochemical apparatus is greater than or equal to 4.15 V.

11. The electrochemical apparatus according to claim 10, wherein
the positive electrode active material comprises lithium cobalt oxide; and
when the state of charge of the electrochemical apparatus is 100%, the open-circuit voltage of the electrochemical apparatus is greater than or equal to 4.35 V.

12. An electronic apparatus, comprising an electrochemical apparatus, the electrochemical apparatus, comprising:
a positive electrode sheet comprising a positive electrode active material layer and a surface layer on the positive electrode active material layer;
a negative electrode sheet comprising a negative electrode active material layer and a surface layer on the negative electrode active material layer; and a separator disposed between the positive electrode sheet and the negative electrode sheet;

wherein the surface layer on the positive electrode active material layer is a stable cathode electrolyte interphase (CEI) film, and the surface layer on the negative electrode active material layer is a stable anode solid electrolyte interphase (SEI) film;

wherein a mass ratio of fluorine to nitrogen in the surface layer on the positive electrode active material layer is A, a mass ratio of fluorine to nitrogen in the surface layer on the negative electrode active material layer is B, and $3 \leq A \leq 50$, and $30 \leq B \leq 300$ and $2 \leq B/A \leq 10$.

13. The electronic apparatus according to claim 12, wherein $20 \leq A \leq 50$, and $70 \leq B \leq 300$.

14. The electronic apparatus according to claim 12, wherein $3.30 \leq B/A \leq 3.90$, or $5.90 \leq B/A \leq 8.10$.

15. The electronic apparatus according to claim 12, wherein a thicknesses of the surface layer on the positive electrode active material layer is 10 nm, and a thickness of the surface layer on the negative electrode active material layer is 10 nm.

16. A method for preparing the electrochemical apparatus according to claim 1, the method comprising:

pre-lithiating the negative electrode sheet of the electrochemical apparatus;

adding a first electrolyte to the electrochemical apparatus for a first formation, wherein the first electrolyte comprises a fluorine-containing compound; and adding a second electrolyte to the electrochemical apparatus for a second formation, wherein the second electrolyte comprises the fluorine-containing compound and a nitrile compound.

17. The method according to claim 16, wherein the fluorine-containing compound comprises at least one of fluoroethylene carbonate, trifluoropropylene carbonate, trifluoroethyl methyl carbonate, fluorocarboxylate, or fluoroether; and the nitrile compound comprises at least one of a mononitrile compound, a dinitrile compound, or a trinitrile compound.

18. The method according to claim 16, wherein based on a mass of the first electrolyte, a mass percentage of the fluorine-containing compound is 5% to 40%; and/or based on a mass of the second electrolyte, a mass percentage of the fluorine-containing compound is 5% to 40%; and/or based on the mass of the second electrolyte, a mass percentage of the nitrile compound is 1% to 6%.

* * * * *